United States Patent [19]

Gurwicz et al.

[11] 4,195,254

[45] Mar. 25, 1980

[54] CONTROL CIRCUIT FOR A D.C. MOTOR

[75] Inventors: David Gurwicz, Gateshead, England; Grant C. Melocik, Chardon, Ohio

[73] Assignee: Caterpillar Tractor Co., Peoria, Ill.

[21] Appl. No.: 924,583

[22] Filed: Jul. 14, 1978

[30] Foreign Application Priority Data

Aug. 3, 1977 [GB] United Kingdom ............... 32576/77

[51] Int. Cl.² .......................................... H02P 5/10
[52] U.S. Cl. .................................. 318/334; 318/434; 318/473; 361/24
[58] Field of Search ............... 318/471, 472, 473, 334, 318/434; 219/497, 499; 361/24

[56] References Cited

U.S. PATENT DOCUMENTS

| 2,056,040 | 9/1936 | Dozler | 318/473 |
| 3,195,044 | 7/1965 | Flanagan | 219/499 |
| 3,809,960 | 5/1974 | Jossic | 318/471 |
| 3,869,597 | 3/1975 | Strange | 219/497 |
| 3,924,102 | 12/1975 | Hanekom | 219/497 |
| 3,930,186 | 12/1975 | Sekiya et al. | 318/471 |

FOREIGN PATENT DOCUMENTS

| 2447669 | 4/1976 | Fed. Rep. of Germany | 219/497 |
| 1210432 | 10/1970 | United Kingdom | 219/497 |

Primary Examiner—Gene Z. Rubinson
Attorney, Agent, or Firm—John L. James

[57] ABSTRACT

A control circuit is provided for a d.c. motor for sensing the temperature of the field winding and automatically reducing the temperature of the field winding when the temperature exceeds a preselected value.

5 Claims, 2 Drawing Figures

CONTROL CIRCUIT FOR A D.C. MOTOR

BACKGROUND OF THE INVENTION

This invention relates to d.c. motors and more particularly to a temperature control circuit for a d.c. motor.

D.C. motors, for example those used on cranes or as traction motors on vehicles such as fork lift trucks, are often, in some conditions of operation, run at power levels which are greater than their normal design limits. In such conditions, the high motor current can cause the motor to overheat, with the risk of damage to the motor. In the past, this problem has usually been overcome by continuously monitoring the temperature of the motor by means of a temperature sensing element, such as a thermistor or a thermally operated switch, positioned within the motor frame, the sensing element supplying a signal to the motor control circuits when overheating occurs. This has the disadvantage that the sensing element must be embodied within the motor during manufacture and that additional motor terminals are required through which the information may be extracted from the element. In addition, it is difficult to replace the sensing element if it develops a fault in use. It is desirable to sense overheating of a d.c. motor without the need to embed a sensing element within the motor.

SUMMARY OF THE INVENTION

According to the present invention, a d.c. motor has an armature, a field winding, and means for sensing the temperature of the field winding comprising voltage sensing means for sensing the resistive voltage drop across the field winding due to current flow in the winding, current sensing means for sensing the current in the field winding, means for comparing the sensed voltage across the field winding with the said current and providing an output signal when the comparison indicates that the temperature of the field winding exceeds a predetermined level.

The invention thus makes use of the known fact that the resistivity of materials such as copper or aluminum which are commonly used in motor field windings increases with temperature, so that the resistance of the motor field winding increases with temperature. By comparing the resistive voltage developed across the field winding due to current flow with the magnitude of the current an indication of the resistance of the field winding is obtained which is used to provide an output signal if the increase in resistance indicates that the temperature of the motor has risen above an acceptable value.

The output signal can be supplied to control circuits to cause a reduction of the field current to a predetermined level at which further heating of the motor will not take place. For example, if the field current is controlled by a chopper control, the output signal can be employed to effect a limitation of the mark-to-space ratio of the chopper control.

Alternatively or additionally, the output signal can be used to provide a visual or other indication to the motor operator, e.g. to the driver of a vehicle incorporating the motor, that the motor is overheating.

Preferably, the current sensing means comprises means, such as a shunt in series with the field winding, for deriving a voltage proportional to the said current, and the means for comparing the sensed voltage across the field winding with the said current comprises a comparator arranged to receive and compare the two said voltages.

The two voltages are preferably supplied to the comparator through respective amplifiers, the gains of the amplifiers being arranged so that the input voltages supplied to the comparator are equal when the temperature of the motor is at a predetermined maximum temperature, the comparator providing the said output signal when the input voltage derived from the voltage across the field winding exceeds the input voltage derived from the field current.

The invention is applicable to series wound motors, shunt wound or separately excited motors, and compound wound motors as well.

DETAILED DESCRIPTION

Figure 1:
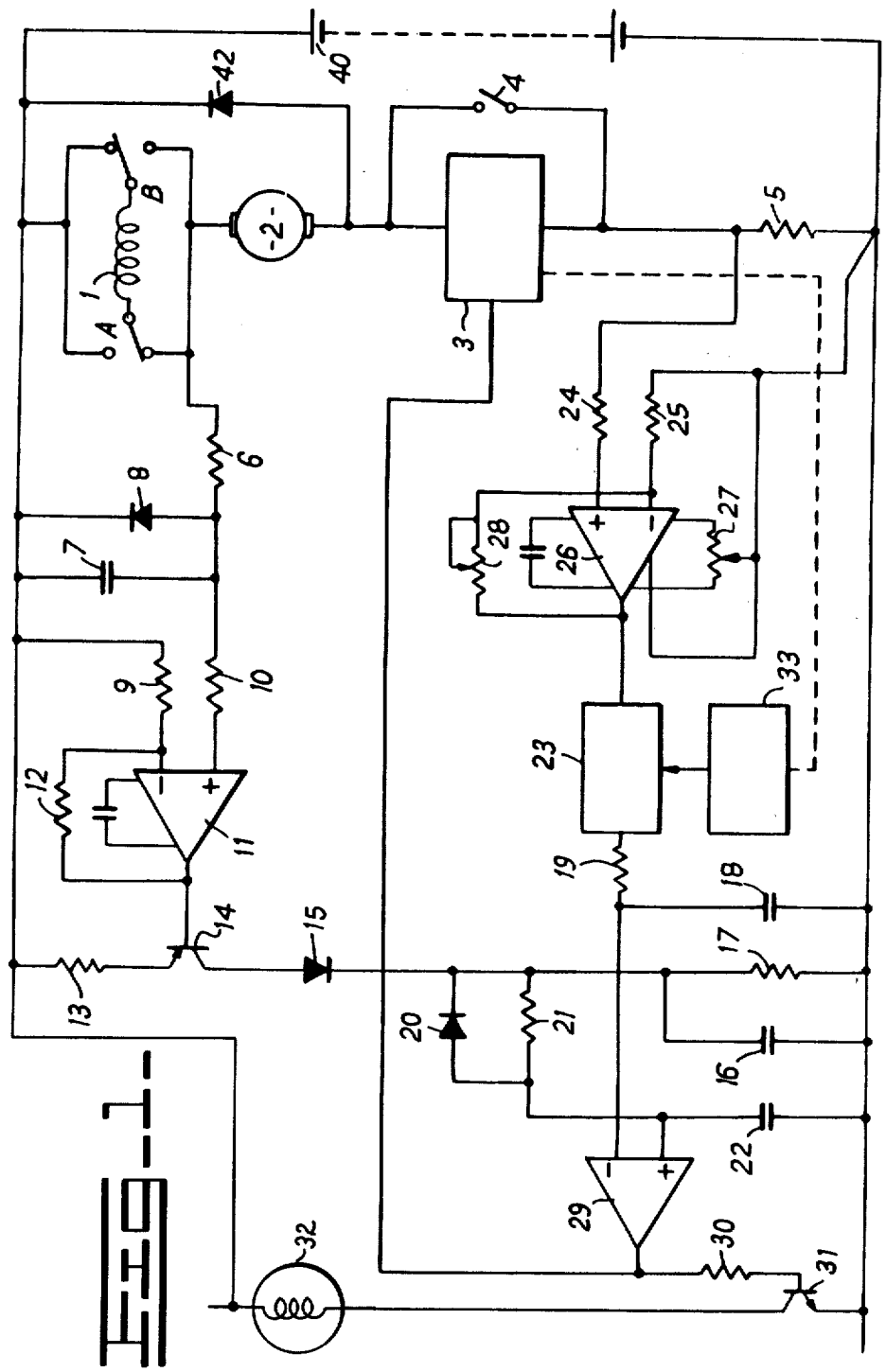
FIG. 1 is a circuit diagram of a d.c. series motor provided with a sensing circuit in accordance with the invention.

Referring to FIG. 1, a d.c. series motor has a field winding 1, provided with the usual direction contactors for connecting the winding in one direction or other to the battery 40, and an armature 2. The field winding 1 and armature 2 are connected in series with a chopper control 3, which may for example be a thyristor chopper of known form, and a current shunt 5. A freewheel diode 42 is connected across the armature and field winding 1. A bypass contactor 4 is connected in parallel with the chopper control 3.

The mean voltage across the field winding 1 is measured by means of an operational amplifier 11. When the chopper control 3 is operating the voltage across the field winding is an alternating voltage, since during "off" periods of the chopper control 3 (when the current flow through the chopper is interrupted and the motor current circulates through the freewheel diode 42) an inductive voltage appears across the field winding in a direction opposite to that of the resistive voltage drop across the winding during "on" periods of the chopper. To prevent this inductive voltage being applied to the amplifier 11, and to smooth the voltage applied to the amplifier, a filter circuit comprising resistor 6, capacitor 7 and diode 8 is connected between the field winding and the amplifier 11. The non-inverting input of the amplifier is connected to the junction of resistor 6 and capacitor 7 through a resistor 10 while its inverting input is connected to battery positive through a resistor 9. The amplifier 11 thus has an output voltage which falls as the voltage at its non-inverting terminal falls with respect to the voltage at its inverting terminal, as the mean resistive voltage drop across the field winding 1 increases with increasing motor current. The gain of the amplifier is preset by selecting the value of resistor 12 connected between the inverting input and the output of the amplifier.

The output of amplifier 11 is connected to the base of a p-n-p transistor 14, the emitter of which is connected to battery positive through a resistor 13 and the collector of which is connected to battery negative through a diode 15 and resistor 17. As the output of the amplifier falls, the voltage drop across the resistor 13 increases, so that the current through resistor 13, diode 15 and resistor 17 increases, increasing the voltage developed across resistor 17. The latter voltage thus varies in proportion with the output of amplifier 11 and therefore with the mean resistive voltage drop across the field winding 1.

The voltage across resistor 17 is applied through a resistor 21 to the non-inverting input of a comparator 29. The non-inverting input of the comparator is also connected to battery negative through a capacitor 12, the resistor 21, capacitor 22, and a diode 20 connected across the resistor providing additional filtering to further smooth the voltage applied to the comparator. A capacitor 16 connected in parallel with resistor 17 also assists in smoothing the voltage applied to the comparator.

The voltage across the current shunt 5 is amplified by an operational amplifier 26 and supplied to the inverting input of comparator 29 via a field effect transistor switch 23 and a resistor 19, a capacitor 18 being connected between the inverting input of amplifier 29 and battery negative. The junction of shunt 5 and the chopper 3 is connected to the non-inverting input of amplifier 26 through a resistor 24, while the other end of the shunt, which is connected to battery negative, is connected to the inverting input of amplifier 26 through a resistor 25. The offset null of amplifier 26 is adjusted by means of variable resistor 27 to ensure that the output of the amplifier is zero when the voltage across the shunt is zero. The gain of amplifier 26 can be adjusted by means of a variable resistor 28 connected between the inverting input and the output of the amplifier. The switch 23, resistor 19 and capacitor 18 act as a "sample and hold" circuit, the switch being closed by a signal 33 derived from the chopper control 3 during "on" periods of the chopper and being opened during "off" periods. During each "on period" the capacitor 17 charges to the output voltage of amplifier 26, and retains this voltage during "off" periods, when the current through the chopper and shunt 5 falls to zero. The output of amplifier 26 is thus accurately proportional to the voltage across shunt 5 during "on" periods of the chopper and therefore to the motor current, irrespective of the pulse frequency of the chopper.

The output of comparator 29 is connected to the chopper control 3 so that the output signal provided when the output of the comparator goes from logic 0 to logic 1, as described below, causes the mark-to-space ratio of the chopper to be reduced to a value low enough to ensure that the motor current is reduced to a level at which further heating of the motor does not take place. The output of comparator 29 is also connected through a resistor 30 to the base of n-p-n transistor 31, the emitter of which is connected to battery negative. The transistor is rendered conducting when the output of comparator 29 goes to logic 1, and can be used to provide a visual or other indication, e.g. by means of lamp 32, that overheating of the motor has occurred.

In operation, the current flow through field winding 1 during "on" periods of the chopper control 3 generates a resistive voltage drop across the field winding, and a voltage proportional to the mean voltage drop is applied to the non-inverting input of comparator 29 as described above. At the same time a voltage proportional to the magnitude of the current is supplied as described above to the inverting input of comparator 29. The gain of amplifier 26 is adjusted so that the voltages applied to the comparator inputs are equal when the resistance of the field winding is at a value corresponding to a predetermined maximum level of the temperature of the motor. When the temperature is below that level the resistance of the field winding is below the said value, so that the resistive voltage drop across the winding for any given current will be less; the voltage at the non-inverting input of comparator 29 is therefore less than that at the inverting input and the output of the comparator remains at logic 0. If the temperature of the motor rises above the predetermined level, the resistance of the field winding increases above the said value, so that the voltage drop across it increases and the voltage at the non-inverting input of comparator 29 rises above that at the inverting input; the output of the comparator therefore rises to logic 1, and causes the motor current to be reduced and a visual or other indication to be given as described above.

The construction of the chopper control 3 may take any of the forms which are well known to those skilled in the art. The means for reducing the mark-to-space ratio of the chopper in response to the signal from comparator 29 may be similar to those used in well-known current limiting systems, such as that shown in United Kingdom patent No. 1,227,138.

It will be appreciated that the described embodiment may be modified in various ways, for example by arranging for the output signal from comparator 29 to disconnect the motor from the supply rather than limiting the mark-space ratio of the chopper control 3. Alternatively, the output signal could be used simply to provide a visual or aural indication to the motor operator, so that corrective action can be taken manually.

Figure 2:
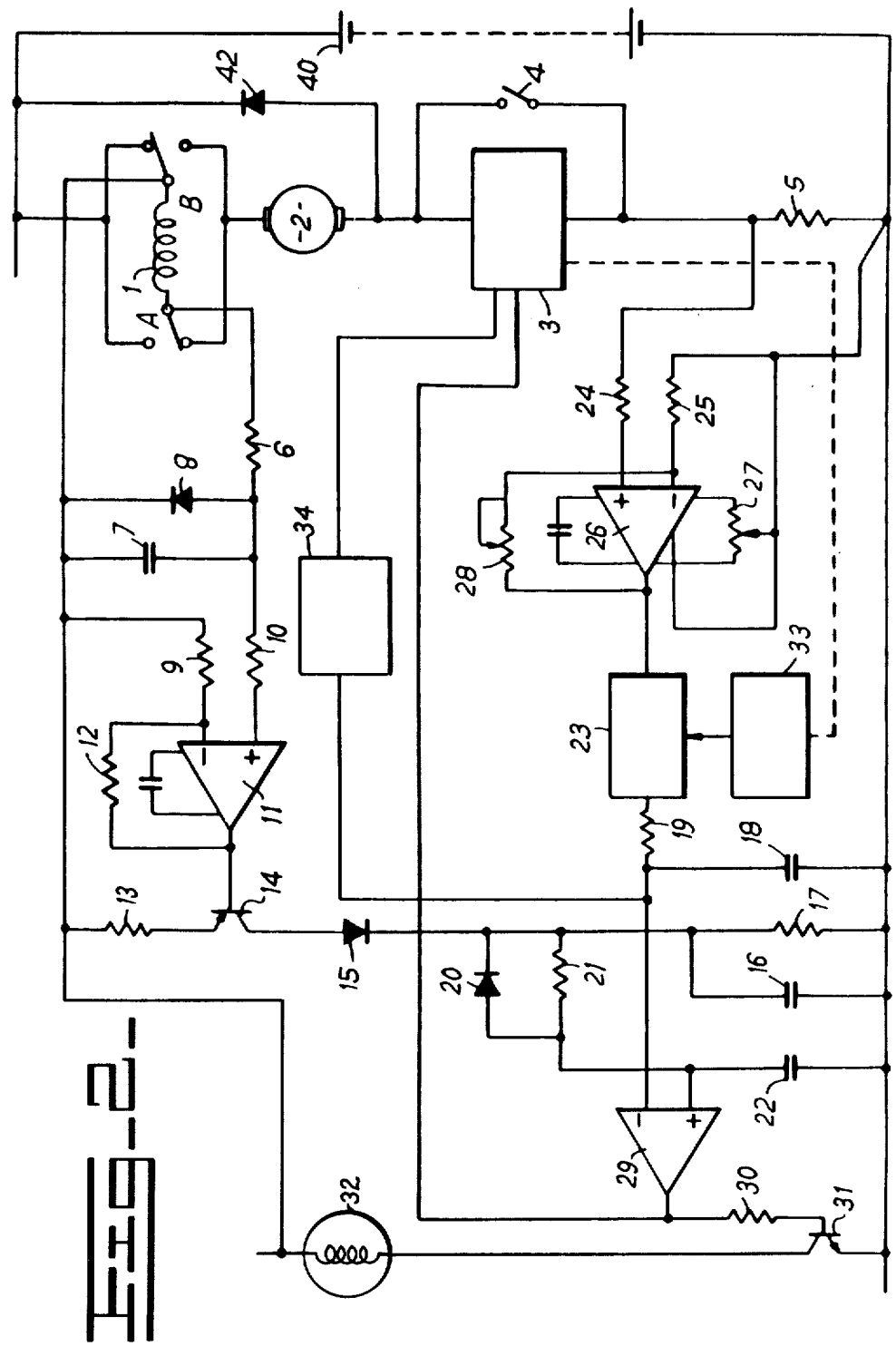
FIG. 2 is a circuit diagram similar to FIG. 1 but showing a different embodiment.

Referring to FIG. 2, the inputs of the circuit sensing the voltage across the field winding 1' are connected directly to points A' and B' at the ends of the field winding, so that the direction contactors are excluded from the voltage sensing circuit. This has the advantage that the voltage sensed is the true voltage across the field winding with no danger of error due to the voltage drop across the contactors, which may be of the same order of magnitude as the resistive voltage drop across the field winding. In this case, the voltage sensing circuit will only operate correctly when the contactors are selected to drive the motor in the "forward" direction, since on reversal of the motor the direction of the resistive voltage drop across the winding will be reversed. Accordingly, means are provided to inhibit operation of the temperature sensing circuit when the contactors are operated to effect "reverse" drive of the motor. These means may take the form, as shown in FIG. 2, of circuitry 34 arranged to apply a high positive voltage to the inverting input of comparator 29' when the direction contactors are selected for "reverse" drive, e.g. on receipt of a signal from the circuitry forming part of the chopper control 3' which controls actuation of the direction contactors. The voltage applied to the inverting input of comparator 29' ensures that the output of the comparator remains low, so that no output signal is supplied to the chopper control or to transistor 31'.

Alternatively, instead of the sensing circuit being inhibited during "reverse" drive, a separate voltage sensing circuit could be provided, connected in the appropriate direction to the field winding, so that sensing can take place during both "forward" and "reverse" drive.

The circuitry to inhibit operation of the temperature sensing means can be used for other purposes. For example, where a bypass contactor 4' is provided, the circuitry can be used to inhibit operation whenever the bypass contactor is open, so that the temperature sensing means operates only when the bypass contactor is closed. In that case, the signal indicating overheating of the motor is used to effect opening of the bypass contactor and operation of the chopper control at a predetermined mark-space ratio.

It will be apparent that the invention can also be applied to d.c. series motors in which reverse drive is effected by reversing the connections to the supply of the armature rather than of the field winding. The circuit of FIG. 1 could then of course be used without modification, the inputs of the voltage sensing circuit being connected directly to the ends of the field winding.

It will be apparent also that the invention can be applied to shunt would or compound wound motors, or to motors having a separately excited field winding. The invention could also be applied to motors having forms of control other than chopper control. The signal indicating overheating of the motor could be used, for example, to effect the switching of a resistor into series circuit with the motor or disconnection of the motor from the supply, in addition to, or as an alternative to, providing a visual or other indication of the overheating condition.

Other aspects, objects and advantages will become apparent from a study of the specification, drawings and appended claims.

The embodiments of the invention in which an exclusive property or privilege is claimed are defined as follows:

1. A circuit for controlling the temperature of a d.c. motor having an armature and a field winding, comprising:
    a chopper control circuit connected in series with the field winding and armature;
    voltage sensing means for sensing the resistive voltage drop across the field winding due to current flow in the winding;
    current sensing means for sensing current in the field winding, said current sensing means including means for deriving a voltage proportional to said current having a current shunt connected in series with the chopper control circuit;
    comparing means for comparing the sensed voltage across the field winding with the voltage proportional to said current and providing an output signal when the comparison indicates that the temperature of the field winding exceeds a predetermined level; and
    a sample and hold circuit operable to sense and retain a voltage proportional to the voltage across the current shunt during each "on" period of the chopper control circuit and to supply the retained voltage to the comparing means, the output from the comparing means limiting the mark-space ratio of the chopper control circuit and controlling the armature current, the chopper control circuit reducing the armature current of the motor in response to receiving the output signal from the comparing means.

2. A circuit, as set forth in claim 1, including a bypass contactor connected in parallel with the chopper control circuit and means for opening the bypass contactor in response to receiving the output signal from the comparing means.

3. A circuit, as set forth in claim 1, including reversal contactors for reversing the connections of the field winding to a d.c. supply and reversing the direction of drive of the motor, and means for inhibiting operation of the comparing means when the reversal contactors are operated to effect reverse drive of the motor.

4. A circuit, as set forth in claim 1, wherein the two said voltages are supplied to the comparing means through respective amplifiers, the gains of the respective amplifiers being sufficient for supplying the comparing means with substantially equal input voltages when the temperature of the motor is at a predetermined magnitude, the comparing means providing the output signal only when the input voltage derived from the voltage across the field winding exceeds the input voltage derived from the field current.

5. A control circuit for a d.c. motor having an armature and a field winding, comprising:
    a chopper control connected in series with the armature;
    voltage sensing means for sensing the resistive voltage drop across the field winding due to current flow in the field winding;
    current sensing means for sensing the current in the field winding; and
    comparing means for receiving a first signal from the voltage sensing means and a second signal from the current sensing means and producing an output signal when the magnitude of the first signal exceeds the magnitude of the second signal, said chopper control receiving the output signal, the mark-to-space ratio of the chopper control being limited in response to receiving the output signal.

* * * * *